July 18, 1939.  A. PERRON  2,166,368
INDEPENDENT WHEEL SUSPENSION FOR AUTOMOBILES
Filed May 21, 1937
Fig. 1.
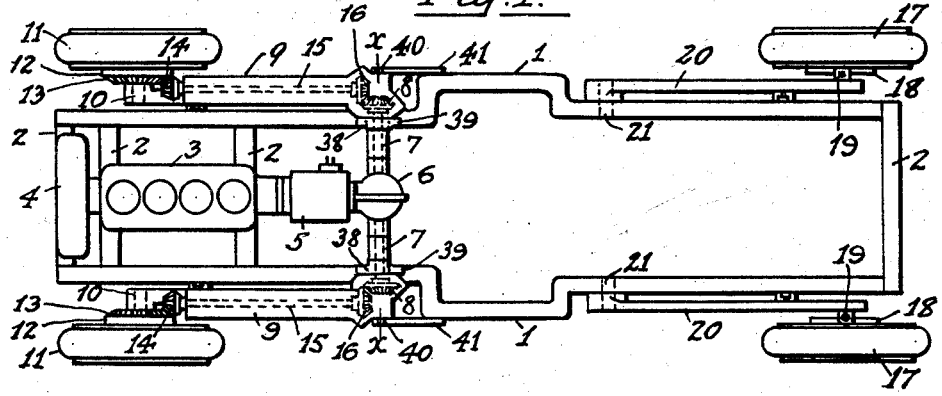
Fig. 2.
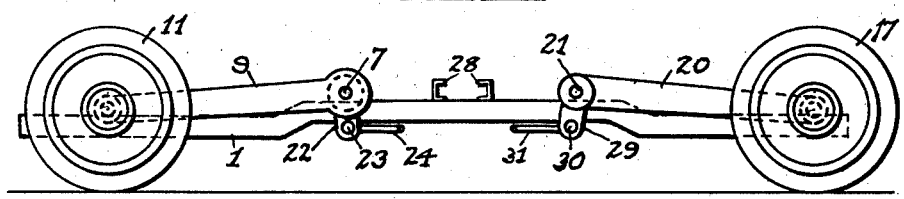
Fig. 3.
Fig. 4.
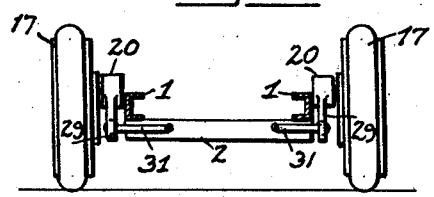
Fig. 5.
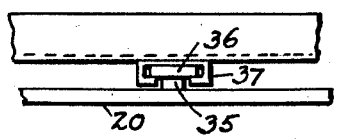
INVENTOR -
Adrian Perron.

Patented July 18, 1939

2,166,368

UNITED STATES PATENT OFFICE 2,166,368

INDEPENDENT WHEEL SUSPENSION FOR AUTOMOBILES

Adrian Perron, Detroit, Mich.

Application May 21, 1937, Serial No. 143,903

2 Claims. (Cl. 280—124)

My invention relates to independent wheel suspensions for automobiles, and its principal object is to provide means whereby each individual wheel is capable of independently moving to accommodate itself to any inequalities and variations in road surfaces.

Another object of my said invention is to provide a construction in which all of the wheel supporting elements are capable of independent movement while at the same time power is transmitted to the driving wheels without the use of the flexible couplings or "cardan" joints such as are usually employed in such cases.

A further object of my said invention is to provide an arrangement of the character referred to which is simple in construction and adapted for manufacture by modern production methods.

With these and other objects in view, I will now describe a preferred embodiment of my said invention with reference to the accompanying drawing, in which—

Figure 1 is a plan view of the chassis of an automobile showing the general arrangement of the essential parts.

Figure 2 is a side elevation of the same.

Figure 3 is a diagram in plan view showing the arrangement of my independent wheel suspension, looking from underneath.

Figure 4 is a vertical section taken on line 4—4 of Figure 3, and

Figure 5 is a fragmentary plan view drawn to an enlarged scale showing one method of guiding the wheel supporting elements.

Like characters designate corresponding parts throughout the several views.

1, 1 are the side members of the chassis frame and 2, 2 are the transverse members by which they are connected together. 3 is the motor arranged in the rear of the vehicle which is provided with a radiator 4 and a transmission 5 of any ordinary construction by which power is transmitted through a differential 6. From the differential 6 extend the transverse shafts 7 on each side thereof which terminate in bevel gears 8, as shown more particularly in Figure 1. Upon the axis x—x of the shafts are pivoted a pair of lever arms 9 which extend rearwardly and are provided with short axles 10 upon which are rotatably mounted the rear wheels 11. These wheels are provided with the usual brake drums 12 having within them brake mechanism of any well known type, and externally of the said brake drums are provided bevel gears 13 which mesh with the bevel pinions 14. These latter pinions are mounted upon shafts 15 which extend rearwardly and are provided with bevel pinions 16 meshing with the pinions 8 upon the shafts 7.

It will be observed from the above description that the driving wheels 11 are capable of vertical movement in relation to the chassis frame while at the same time power is transmitted to them from the motor 3. The front wheels 17, provided with usual brake drums 18 and accompanying brake mechanism, have their axles pivoted at 19 to lever arms 20, the said arms being pivoted at 21 to the chassis side members 1. The wheels 17 are provided with steering mechanism of any conventional construction, not shown, and with means for operating brake mechanisms within the drums 18, which form no part of the present invention.

Integral with the arms 9 are short downwardly extending arms 22 which are connected by ball and socket joints 23 to rods 24, the said rods being provided with collars 25, and upon these collars press the helical compression springs 26 which re-act against abutments 27 fixed upon transverse members 28 connected to the chassis frame, the arrangement being such that vertical movement of the wheels 11 is resisted by the said springs which have an initial compression which is proportioned to the weight upon the wheels, any suitable means being provided for adjusting the initial compression of the said springs.

Integral with the lever arms 20 are short downwardly extending arms 29 which are connected by ball and socket joints 30 to rods 31, the said rods being provided with collars 32 and upon these collars press the helical compression springs 33 which re-act against abutments 34 fixed upon the transverse members 28 above referred to, the arrangement being such that vertical movement of the wheels 17 is resisted by the said springs which have an initial compression proportioned to the weight upon the front wheels, the initial pressure being adjusted as above stated with reference to the springs 26.

In order to prevent lateral displacement of the lever arms 9 and 20 due to side pressure upon the respective wheels, each of the levers is provided with a stud 35 having an enlarged head 36 of circular or other shape adapted to slidably engage in a channel-like member 37 secured to the corresponding chassis frame member 1, as shown more in detail in Figure 5 of the drawing, the member 37 being further provided with closed ends by which vertical movements of the levers are limited as well known in the art.

The arms 9 are, of course, formed as hollow members to receive the shafts 15, and the bevel gears 13 and pinions 14 are encased in suitable grease-filled covers. It is contemplated that the pivoted ends of the arms 9 will be formed as a gear box for the bevel pinions 8 and 16, the said boxes being provided upon their inner ends with journals 38 supported in bearings 39 and upon their outer ends with journals 40 which are supported in bearings in the members 41 secured to the chassis frame.

It will be observed from the foregoing description and by reference to the drawing that I have provided an independent wheel suspension which is simple in construction and well adapted to the purpose outlined, and while I have herein described a preferred embodiment of my invention, it will be readily understood that changes in detail may be made to meet various requirements without departing from the spirit of my invention as defined in the appended claims.

Having thus described my said invention, what I claim and desire to secure by Letters Patent of the United States is:

1. In an apparatus of the character described, the combination, with a chassis frame having a pair of longitudinal members spaced apart, of a pair of radius arms pivoted to the outsides of said members, wheel spindles fixed to said arms, wheels upon said spindles, downwardly extending levers upon said arms arranged substantially at right angles thereto, tension rods connected to said levers disposed at an angle to said side members and extending across one another in the space therebetween, and spring tension means upon said rods positioned within said space and adapted to resist upward movement of said wheels in a vertical plane.

2. In an apparatus of the character described, the combination, with a chassis frame having a pair of longitudinal members spaced apart, of a pair of radius arms pivoted to the outsides of said members, wheel spindles fixed to said arms, wheels upon said spindles, downwardly extending levers upon said arms arranged substantially at right angles thereto, tension rods connected by ball and socket joints to said levers disposed at an angle to said side members and extending across one another in the space therebetween, and adjustable spring tension means upon said rods positioned within said space and adapted to resist upward movement of said wheels in a vertical plane.

ADRIAN PERRON.